United States Patent
Rezgui et al.

(10) Patent No.: US 7,258,164 B2
(45) Date of Patent: Aug. 21, 2007

(54) PUMPING SYSTEM FOR OIL WELLS

(75) Inventors: Fadhel Rezgui, Sceaux (FR); Patrice Ligneul, Chaville (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 150 days.

(21) Appl. No.: 10/517,672

(22) PCT Filed: Jun. 11, 2003

(86) PCT No.: PCT/EP03/50221

§ 371 (c)(1),
(2), (4) Date: Dec. 9, 2004

(87) PCT Pub. No.: WO03/106932

PCT Pub. Date: Dec. 24, 2003

(65) Prior Publication Data

US 2005/0217843 A1    Oct. 6, 2005

(30) Foreign Application Priority Data

Jun. 13, 2002  (FR) ................................. 02 07264

(51) Int. Cl.
*E21B 43/00*    (2006.01)

(52) U.S. Cl. ..................................... 166/68.5; 166/105
(58) Field of Classification Search .................. 166/68, 166/68.5, 105
See application file for complete search history.

(56) References Cited

U.S. PATENT DOCUMENTS

| 5,388,455 A | 2/1995 | Hamby et al. |
| 5,521,592 A | 5/1996 | Veneruso |
| 6,119,781 A * | 9/2000 | Lemetayer et al. ......... 166/369 |

FOREIGN PATENT DOCUMENTS

| DE | 29607630 U | | 8/1996 |
| JP | 63-67323 | * | 2/1988 |
| WO | WO 0236936 A | | 5/2002 |

* cited by examiner

*Primary Examiner*—William P Neuder
(74) *Attorney, Agent, or Firm*—Kevin P. McEnaney; William Batzer; James L. Kurka

(57) ABSTRACT

A pumping system (13) for oil wells (1) comprises a pump (20) immersed at the bottom of the well (4) and a flow-meter (32) associated with the pump (20), the immersed pump (20) being supplied by an electric supply source (26). The flow-meter (32) is an electromagnetic flow-meter, also electrically supplied by the supply source (26) of the pump.

6 Claims, 2 Drawing Sheets

PUMPING SYSTEM FOR OIL WELLS

Figure 1:
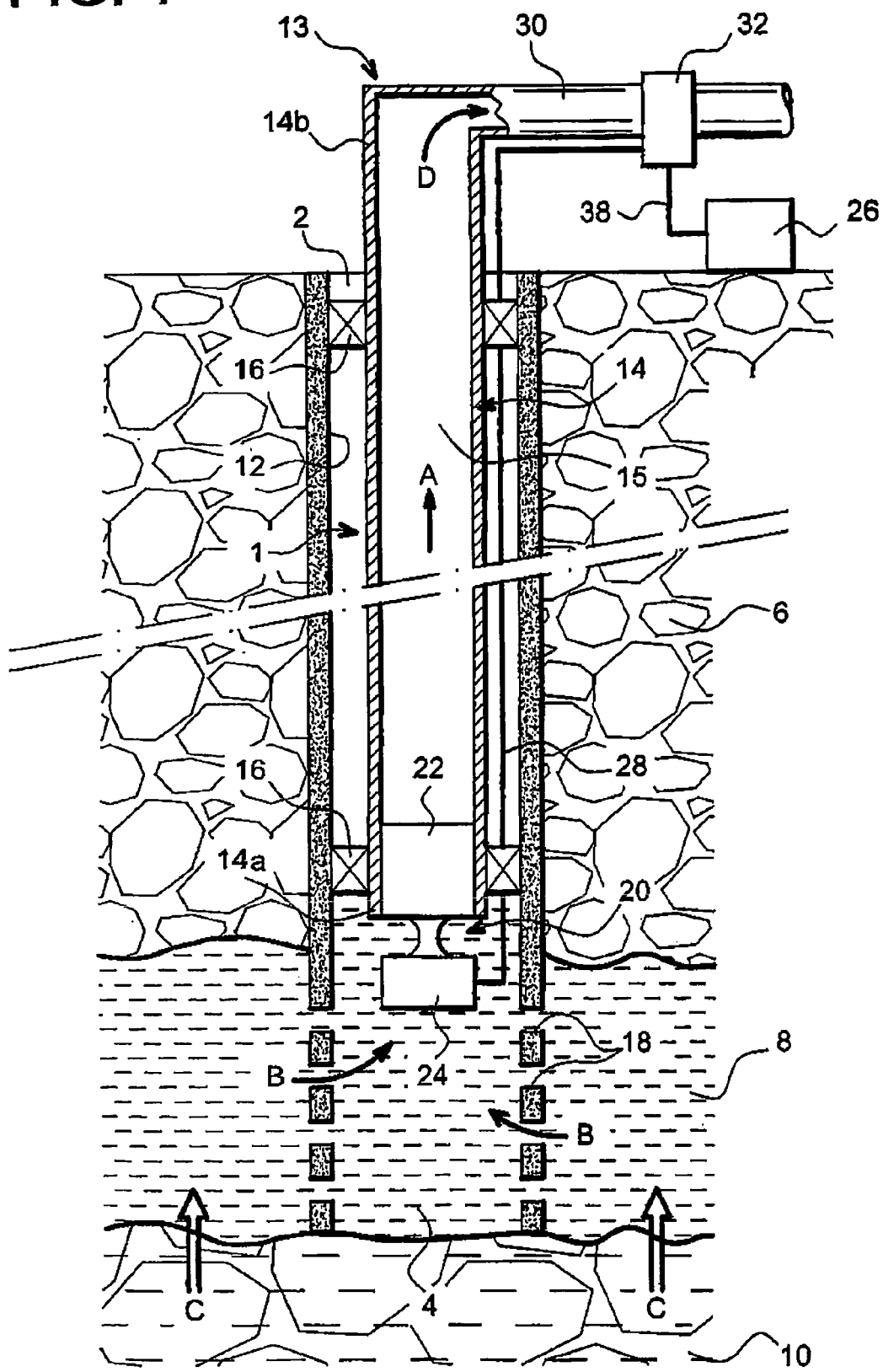

The present invention relates to pumping systems for use in oil wells, in particular to such systems comprising a pump immersed at the bottom of the well and a flow-meter associated with the pump.

In the process of extracting oil from wells drilled into oil-bearing formations, the equipment used to perform such operations is chosen in relation to the type of well. When the fluids in the formation are essentially made up of hydrocarbons, the well often produces the fluids naturally to the surface, and therefore does not require any additional means to promote the extraction of the hydrocarbons contained in the well. Nonetheless it frequently occurs that the hydrocarbons to be extracted from the well are mixed with water. This mixture typically results from the proximity of a water-containing formation to the hydrocarbon-containing formation (typically there is a water layer immediately below each hydrocarbon layer). Therefore, especially at a lower part of the hydrocarbon reservoir, it is often impossible to prevent the formation of a hydrocarbon/water mixture.

One major consequence of the presence of the hydrocarbon/water mixture inside the well is to make the well non-naturally producing, i.e. the pressure of the fluids in the formation is insufficient to overcome the hydrostatic pressure of the column of fluids in the well. In such a case, it is necessary to use additional means for extracting the fluids from the well.

A number of techniques are known for enhancing production from well in such circumstances.

One technique involves the injection of gas, preferably nitrogen, above the hydrocarbon producing areas, so as to lighten the hydrocarbon/water mixture confined in the production tubing ("gas lift"). However, this technique can often be unsatisfactory, in particular in terms of the quantity of mixture extracted relative to the volume of gas to be injected. In addition, the implementation of this technique requires heavy, relatively costly equipment such as a high power compressor and a bottom valve.

Another known technique consists of positioning an electric pump at the ground surface and of connecting this pump directly to the bottom of the well. Such an approach is limited in application on account of pump cavitation occurring when the pressure drop reaches 0.6-0.7 Bar.

A more recent method comprises the use of an immersed pump positioned at the bottom of the well. Such electric pumps are known as "electric submersible pumps" or "ESP's". In view of the substantial investment and implementation costs in connection with the use of ESP's, it is important to be able to control certain parameters so that the pump can be operated under optimum yield conditions and does not incur any damage. In this respect, it is advisable to monitor any possible overheating and various other data such as gas production or the production of sand.

For an operator to be able to know the yield of an ESP, the pump is typically coupled to a venturi flow-meter generally positioned downstream from the pump, which can be used to determine the velocity of the mixture coming from the well and passing through flow-meter. Using measurements of the velocity of the mixture it then becomes possible to deduce its flow rate. However, the installation comprising an ESP and a venturi flow-meter has some major disadvantages which may prove to be detrimental during hydrocarbon production operations. In addition to the excessively high costs connected with the pump, it is also necessary to add the cost of the venturi flow-meter which is also very substantial on account of the presence of two high accuracy pressure gauges. Moreover, this type of flow meter is intrusive and complicates or prohibits any logging below the meter. There is also a drawback concerning the determination of the pump's hydraulic power. With a venturi flow-meter intended to give information on the velocity of the mixture, the value measured via a drop in pressure between the head and neck of the venturi depends upon the square of the mixture velocity and the density of the mixture. This specific characteristic means that inaccuracies exist in the determination of the value of this velocity, these inaccuracies being greater the slower the velocity of the mixture passing through the flow-meter. When designing this type of installation, it is therefore necessary to give priority either to low load losses to the detriment of accurate speed measurement, or to limitation of inaccuracies in this velocity measurement contributing to load losses in the flow-meter.

With an installation having the limitations in performance as described above, control over the hydraulic power of the pump and hence over the yield of the pump remains very limited and under does not enable an operator to ensure the proper functioning of the pump positioned at the bottom of the drilling well.

The present invention aims to provide a pump system comprising a pump immersed at the bottom of the well and a flow-meter associated with this the pump, which overcomes at least in part the disadvantages of the above-described prior art systems. The invention also aims to provide a system in which it possible to obtain information on the yield of the pump system in less costly fashion and in more precise manner than with installations of the prior art.

The present invention provides a pump system for use in a hydrocarbon well, comprising a pump capable of being immersed in a hydrocarbon well, an electrical supply source providing electrical power to the pump when immersed in the well, and a flow meter associated with the pump when immersed in the well, characterised in that the flow meter is an electromagnetic flow meter which is supplied with electrical power from the electrical supply source.

The use of an electromagnetic flow-meter makes it possible to overcome problems connected with load losses in the installations of the prior art. Since an electromagnetic flow-meter can be non-intrusive, the passage through this flow-meter of a hydrocarbon/water mixture does not in any way require an increase in the power to be delivered to the immersed pump system so that it can generate a mixture flow that is equivalent to the flow it would have generated without the presence of the flow-meter. It is therefore possible to achieve substantial savings in terms of operating production costs for the well.

In addition, by using the electric supply source of the pump (typically of the order of hundreds of kilowatts), the electromagnetic flow-meter does not require any additional supply. In particular, since electric pumps typically require very high current (in the order of a few dozen Amperes) the possible resulting magnetic fields that can be generated by coils in the flow-meter make it possible to generate easily measurable Faraday effects. The power consumed by induction coils of the flow-meter remain fully derisory in relation to the power required for the functioning of the immersed pump system, so that the addition of this type of flow-meter does not in any way require any great increase in capacity of the electric supply source used.

Another advantage of the invention concerns the measurement made by the electromagnetic flow-meter. Unlike a venturi flow-meter, electromagnetic flow meters measure an electric voltage, which is directly dependent upon the velocity of the mixture. Therefore a measurement method is made available which is much more precise than in the prior art, which makes it possible to control the yield of the immersed pump system in a relatively easy manner. Therefore, with the installation of the invention it is possible to limit substantially the risks of deterioration of the pump system in the well.

Where the hydrocarbon/water mixture flowing through the flow-meter is electrically conductive, it is possible to create a Faraday effect within the flow-meter.

According to one preferred embodiment of the invention, the system comprises at least one production tubing extending from the pump, when positioned in the well, to the well head, the pump and flow meter being supported on the production tubing.

In addition, the system may comprise surface piping positioned outside the well and connected to the production tubing, this surface piping carrying the electromagnetic flow-meter.

Other characteristics and advantages of the invention will become clearer on reading the following non-limiting description below.

Figure 2:
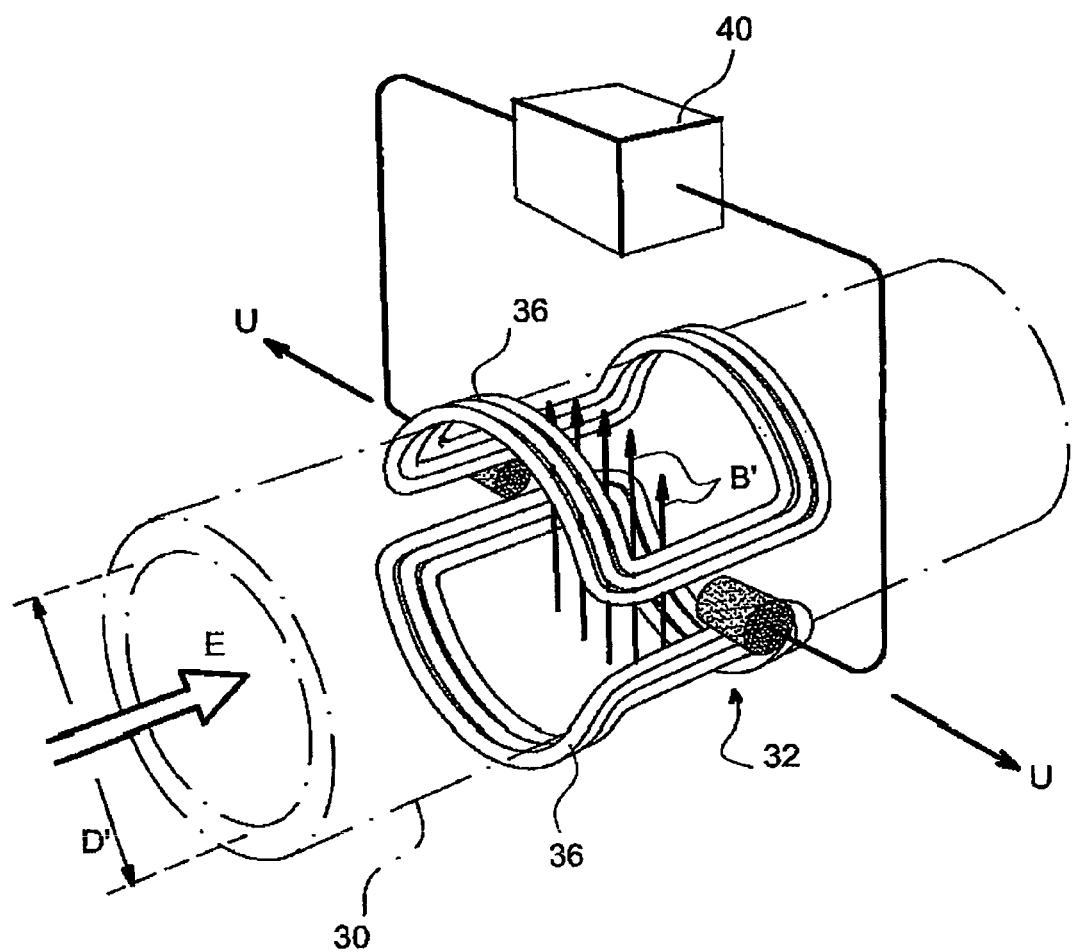

The present invention will now be described in relation to the accompanying drawings in which:

FIG. 1 is a schematic section view of a well, equipped with a pump system according to one embodiment of the invention; and FIG. 2 is a schematic perspective view of an electromagnetic flow-meter used in the system shown in FIG. 1.

Referring to FIG. 1, a well 1 is shown which schematically passes through three separate formations. Downwardly from well head 2 these are successively a rock type formation 6 with no fluids, a hydrocarbon-rich formation 8 and a water-containing formation 10. The well 1 has a cemented lining 12 which provides mechanical support of the well and zonal isolation between the various formations. A pumping system is provided for enhancing the production of fluids from the well and is generally depicted by reference 13.

The system 13 comprises production tubing 14 extending from the well head 2 down to the well bottom 4. The production tubing 14 is positioned and maintained inside the drilling well by means of seals 16 preventing circulation of the hydrocarbons in parts other than an inner space 15 delimited by the production tubing 14. At reservoir level, the cemented lining 12 has a plurality of openings 18 making it possible for the hydrocarbons in reservoir 8 to pass through this lining 12 in the direction of the production tubing 14.

The system 13 comprises an ESP 20 located at the well bottom 4 and mounted on a lower end 14a of the production tubing 14. While the ESP is shown here at the bottom of the well, It will be appreciated that it can be positioned at any location in the well below the surface according to the geometry and production characteristics of the well.

The ESP 20 comprises a pump 22 and an electric motor 24 able to drive the pump 22. The ESP 20 is supplied with electric power from an electric supply source 26 placed outside the well via a supply cable 28 connected to the motor 24.

At the upper end 14b of the production tubing 14, surface piping 30 is connected firstly to the production tubing 14 and secondly to collection means (not shown) to collect a hydrocarbon/water mixture so as to allow separation of the hydrocarbon/water mixture and re-injection of the separated water into the underground formation.

The system 13 also comprises an electromagnetic flow-meter 32, carried by surface tubing 30 and capable of measuring the flow rate of the hydrocarbon/water mixture produced from the well 1. The flow-meter 32 can also be mounted on the production tubing 14, preferably close to the ESP 20. However, the mounting of the flow-meter 32 on the surface tubing 30 is often easier to implement.

With reference to FIGS. 1 and 2 the electromagnetic flow-meter 32 comprises two induction coils 36, arranged on opposite sides of the surface tubing 30, through which an electric current passes derived from the electric supply source 26. Such a flow meter has the advantage that it is non-intrusive, i.e. it does not change the flow profile in the tubing 30. Preferably the flow-meter 32 electrically is connected in series with the ESP 20 to source 26 via a supply cable 38.

It is also possible to provide for inductive coupling (not shown) so as to generate currents of different frequencies in induction coils 36 and the electric motor 24 of the ESP 20.

During operation, when the well 1 is naturally producing, the hydrocarbons contained in the reservoir 8 flow into the production tubing 14 as shown by arrow A in FIG. 1, via perforations 18 in the lining 12 of the well 1 as shown by arrows B.

Nevertheless it frequently occurs that the fluid to be extracted from the well 1 is made up of a mixture of hydrocarbons and water. The proximity between hydrocarbon-containing formation 8 and water-containing formation 10 leads to movement of the water from the formation 10 towards the reservoir of hydrocarbons 8 as shown by arrows C. This phenomenon causes the formation of a hydrocarbon/water mixture and makes the fluid to be extracted from the well 1 considerably heavier. In such a case, the well 1 is often no longer capable of producing fluids to the surface, and additional means are required to promote the lifting of the hydrocarbon/water mixture to the surface.

ESPs 20 are used to alleviate this problem so that the hydrocarbon/water mixture enters the production tubing 14 then, as shown by arrow D, into the surface tubing 30. The hydrocarbon/water mixture then flows through the surface tubing 30 in the direction of the mixture collection means passing through the electromagnetic flow-meter 32.

With reference to FIG. 2, when the mixture flows inside tubing 30, a magnetic field B' perpendicular to a direction of flow of the mixture shown by arrow E and generated by induction coils 36, induces a voltage U perpendicular to the magnetic field B' and to the direction of flow of the mixture. According to this principle, based on Faraday's laws, the voltage U measured by measuring apparatus 40 is directly proportional to the speed of flow of the fluid circulating through the electromagnetic flow-meter 32. With knowledge of the inner diameter D' of tubing 30, and therefore the measurement of its cross section, it is possible to determine the volume flow rate of the fluids in the well 1. This measurement is important in the sense that it can be used to define the hydraulic power released by the ESP 20, by simple multiplication with the difference in pressure of the mixture upstream and downstream from the pump 22. The hydraulic power released by the ESP 20 can then be compared with the electric power it consumes, which can for example be measured using a conventional energy meter.

The end purpose of measuring the velocity of the mixture passing through the electromagnetic flow-meter 32 is to be able to control the total energy yield of the ESP 20, which is made by simply establishing the ratio between the determined hydraulic and electric powers. Therefore, in a relatively simple manner, it is possible to control precisely the yield of the ESP 20 in order to avoid any damage to the pump during hydrocarbon extraction operations. This simplicity is further enhanced by the fact that the electric supply source 26, delivering a power ranging from approximately 100 kw to approximately 1000 kw and an intensity ranging from approximately 10 A to approximately 100 A to operate the pumping system 20, can also supply the electromagnetic flow-meter 32. Given the substantial currents circulating in flow-meter 32, the induction coils 36 only need a very limited number of spirals to obtain a magnetic field B' of a few miliTesla, this order of magnitude of the magnetic field B' being largely sufficient to generate easily measurable induced voltages U.

The invention claimed is:

1. A pump system for passing a hydrocarbon/water mixture in a hydrocarbon well from the well to the surface through a tubing, said pump system comprising:
   an electric submersible pump immersed in the hydrocarbon well and positioned operatively at a first portion of said tubing inside said well;
   an electrical supply source operatively connected to said pump for providing electrical power to the pump when immersed in the well; and
   an electromagnetic flow meter positioned at a second portion of said tubing downstream said pump said electromagnetic flow meter being operatively connected with said pump when immersed in the well said electromagnetic flow meter is supplied with electrical power from said electrical supply source and wherein said electromagnetic flow meter comprises means for measuring a velocity of the hydrocarbon/water mixture passing through said tubing.

2. The system as claimed in claim 1, wherein said tubing comprises a production tubing extending from the bottom of the well to a well head, the pump being carried on the production tubing.

3. The system as claimed in claim 2, wherein said tubing further comprises a surface tubing positioned outside the well and connected to the production tubing, the electromagnetic flow-meter being carried on the surface tubing.

4. The system as claimed in claim 1, wherein the pump is driven by an electric motor.

5. The system as claimed in claim 1, wherein the electric supply source is positioned at the surface and is capable of delivering a power of between 100 and 1000 kW, and a current of between approximately 10 and 100 A.

6. The system as claimed in claim 1, wherein the pump and the electromagnetic flow-meter are connected in series.

* * * * *